US011932200B2

(12) United States Patent
Van Wiemeersch et al.

(10) Patent No.: US 11,932,200 B2
(45) Date of Patent: Mar. 19, 2024

(54) VEHICLE AND METHOD OF CONTROLLING A POWERED DOOR BASED ON USER IDENTIFICATION

(71) Applicant: Ford Global Technologies, LLC, Dearborn, MI (US)

(72) Inventors: John Robert Van Wiemeersch, Novi, MI (US); Lawrence Amadi, Nottingham, MA (US); Stuart C. Salter, White Lake, MI (US); Kristopher Karl Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 17/541,714

(22) Filed: Dec. 3, 2021

(65) Prior Publication Data

US 2023/0174018 A1 Jun. 8, 2023

(51) Int. Cl.
*B60R 25/25* (2013.01)
*B60R 25/24* (2013.01)
(Continued)

(52) U.S. Cl.
CPC .............. *B60R 25/25* (2013.01); *B60R 25/24* (2013.01); *B60R 25/305* (2013.01); *B60R 25/31* (2013.01);
(Continued)

(58) Field of Classification Search
CPC ....... B60R 25/25; B60R 25/24; B60R 25/305; B60R 25/31; B60R 2325/205; B60R 16/023; B60R 11/00; B60R 11/04; B60R 2011/004; E05F 15/611; E05F 15/76; E05F 2015/767; E05F 15/73; E05F 15/60; G06V 40/166; G06V 40/172; G06V 40/25; G06V 20/56; G06V 40/10; G06V 40/16; E05Y 2201/434; E05Y 2400/42; E05Y 2400/44; E05Y 2400/66; E05Y 2400/85; E05Y 2900/531; G07C 2209/63; G07C 9/00309; G07C 9/00563; B60J 5/047

See application file for complete search history.

(56) References Cited

U.S. PATENT DOCUMENTS 10,525,850 B1 1/2020 Tang et al.
2018/0236972 A1 8/2018 Linden et al.
(Continued)

*Primary Examiner* — Brian P Sweeney
(74) *Attorney, Agent, or Firm* — Frank Lollo; Price Heneveld LLP

(57) ABSTRACT

A vehicle includes a powered door having an actuator to move the door between open and closed positions, a transceiver configured to communicate with one or more mobile devices, and an imaging device oriented to capture images in a region proximate to the powered door. A controller processes the captured images and controls the actuator to move the door to the open position when a mobile device is detected proximate the vehicle and a user is detected in the captured images located in a door detection zone. The controller moves the door to the open position when a face of a user is recognized as an authorized user located in the door detection zone. The controller moves the door to the open position when a gait of the user is detected and identifies the gait are indicative of an authorized user located in the door detection zone.

17 Claims, 8 Drawing Sheets

(51) Int. Cl.
  *B60R 25/30* (2013.01)
  *B60R 25/31* (2013.01)
  *E05F 15/611* (2015.01)
  *E05F 15/73* (2015.01)
  *E05F 15/76* (2015.01)
  *G06V 40/16* (2022.01)
  *G06V 40/20* (2022.01)

(52) U.S. Cl.
  CPC ............ *E05F 15/611* (2015.01); *E05F 15/76* (2015.01); *G06V 40/166* (2022.01); *G06V 40/172* (2022.01); *G06V 40/25* (2022.01); *B60R 2325/205* (2013.01); *E05F 2015/767* (2015.01); *E05Y 2201/434* (2013.01); *E05Y 2400/42* (2013.01); *E05Y 2400/44* (2013.01); *E05Y 2400/66* (2013.01); *E05Y 2400/85* (2013.01); *E05Y 2900/531* (2013.01)

(56) References Cited

U.S. PATENT DOCUMENTS

| 2019/0051069 A1* | 2/2019 | Cooley ................ G10L 17/22 |
| 2020/0064444 A1 | 2/2020 | Regani et al. |
| 2020/0193005 A1* | 6/2020 | Babala ................ G06V 40/70 |

* cited by examiner

VEHICLE AND METHOD OF CONTROLLING A POWERED DOOR BASED ON USER IDENTIFICATION

FIELD OF THE DISCLOSURE

The present disclosure generally relates to a vehicle having powered doors, and more particularly relates to a system and method of controlling powered vehicle doors based on user location and identification.

BACKGROUND OF THE DISCLOSURE

Motor vehicles are commonly equipped with various closure doors to allow ingress and egress of the vehicle passenger compartment as well as to access the trunk and front compartment. The closure doors may be powered with electric motors which operate to open and close the doors. It would be desirable to provide for control of powered doors in a manner that takes into consideration the identification of a user of the vehicle.

SUMMARY OF THE DISCLOSURE

According to a first aspect of the present disclosure, a vehicle is provided that includes a powered door having an actuator, wherein the powered door is movable between open and closed positions, a transceiver configured to communicate with one or more mobile devices, and an imaging device oriented to capture images in a region proximate to the powered door. The vehicle also includes a controller processing the captured images and controlling the actuator, wherein the controller is configured to activate the actuator to move the powered door to the open position when a mobile device is detected proximate the vehicle and a user is detected in the captured images located in a door detection zone, the controller is configured to activate the actuator to move the powered door to the open position when the controller detects a face of the user in the captured images using facial recognition and recognizes the user as an authorized user located in the door detection zone, and the controller is configured to activate the actuator to move the door to the open position when the controller detects a gait of the user and identifies the gait is indicative of an authorized user located in the door detection zone.

Embodiments of the first aspect of the disclosure can include any one or a combination of the following features:
  the actuator actuates the door to move the door to the open position when the authorized user with a mobile device is detected in the door detection zone;
  the actuator comprises a motor;
  the door comprises a driver's door of the vehicle;
  the imaging device comprises a camera;
  the mobile device comprises one of a phone and key fob;
  the controller determines an acceleration based gait of the user by processing an acceleration signal generated by an acceleration signal in the mobile device, and wherein the controller compares the acceleration based gait determined with the mobile device with an image based gait determined from the captured images to determine if the user is the authorized user;
  the image based gait is detected by monitoring a body of the user;
  the controller looks for the gait of the user when two or more persons are detected in the captured images in the region;
  the vehicle has a plurality of powered doors each having an actuator, wherein the controller detects the user within a door detection zone proximate one powered door and opens the one powered door; and
  the controller detects a plurality of users and activates a plurality of actuators to open a plurality of doors.

According to a second aspect of the present disclosure, a vehicle is provided that includes a plurality of powered doors, a plurality of actuators for moving the plurality of powered doors between open and closed positions, a transceiver configured to communicate with one or more mobile devices, and a plurality of imaging devices oriented to capture images in a region proximate to the plurality of powered doors. The vehicle also includes a controller processing the captured images and controlling the plurality of actuators, wherein the controller is configured to activate a first actuator to move a first powered door to the open position when a mobile device is detected proximate the vehicle and a user is detected in the captured images located in a first door detection zone, the controller is configured to activate the first actuator to move the first powered door to the open position when the controller detects a face of a first user in the captured images using facial recognition and recognizes the first user as an authorized first user located in the first door detection zone, and the controller is configured to activate the first actuator to move the first door to the open position when the controller detects a gait of the user and identifies the gait is indicative of an authorized user located in the first door detection zone.

Embodiments of the second aspect of the disclosure can include any one or a combination of the following features:
  the controller activates a second powered door to move the second powered door to the open position when the controller detects a face of a second user in the captured images using facial recognition and recognizes the second user as an authorized second user located in a second door detection zone; and
  the controller determines an acceleration based gait of the first user with an acceleration signal generated by an acceleration signal in the mobile device, and wherein the controller compares the acceleration based gait determined with the mobile device with an image based gait acquired by the plurality of imaging devices to determine if the first user is the authorized first user.

According to a third aspect of the present disclosure, a method of controlling a powered door on a vehicle is provided. The method includes the steps of detecting a mobile device associated with an authorized user in a region proximate the vehicle, capturing images in the region proximate to the powered door of the vehicle with an imaging device, processing the captured images to detect one or more users, and searching for a face of the authorized user in the captured images. The method also includes the steps of activating an actuator to move the powered door to the open position when the face of the authorized user is detected using image recognition, detecting a gait of the authorized user in the captured images, determining a presence of the authorized user based on the detected gait, and activating the actuator to move the powered door to the open position when the gait is indicative of the authorized user.

Embodiments of the third aspect of the disclosure can include any one or a combination of the following features:
  the mobile device comprises one of a phone and key fob;
  determining an acceleration based gait of the user with an acceleration signal generated in the mobile device, and comprising the acceleration based gait determined with the mobile device with an image based gait acquired by the plurality of imaging devices to determine if the user is an authorized user;

the image based gait is detected by monitoring a body of the user;

the gait of the authorized user is processed when two or more users are detected in the captured images in the region; and the vehicle has a plurality of powered doors each having an actuator, wherein the method detects a user within a door detection zone proximate one powered door and opens the one powered door.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
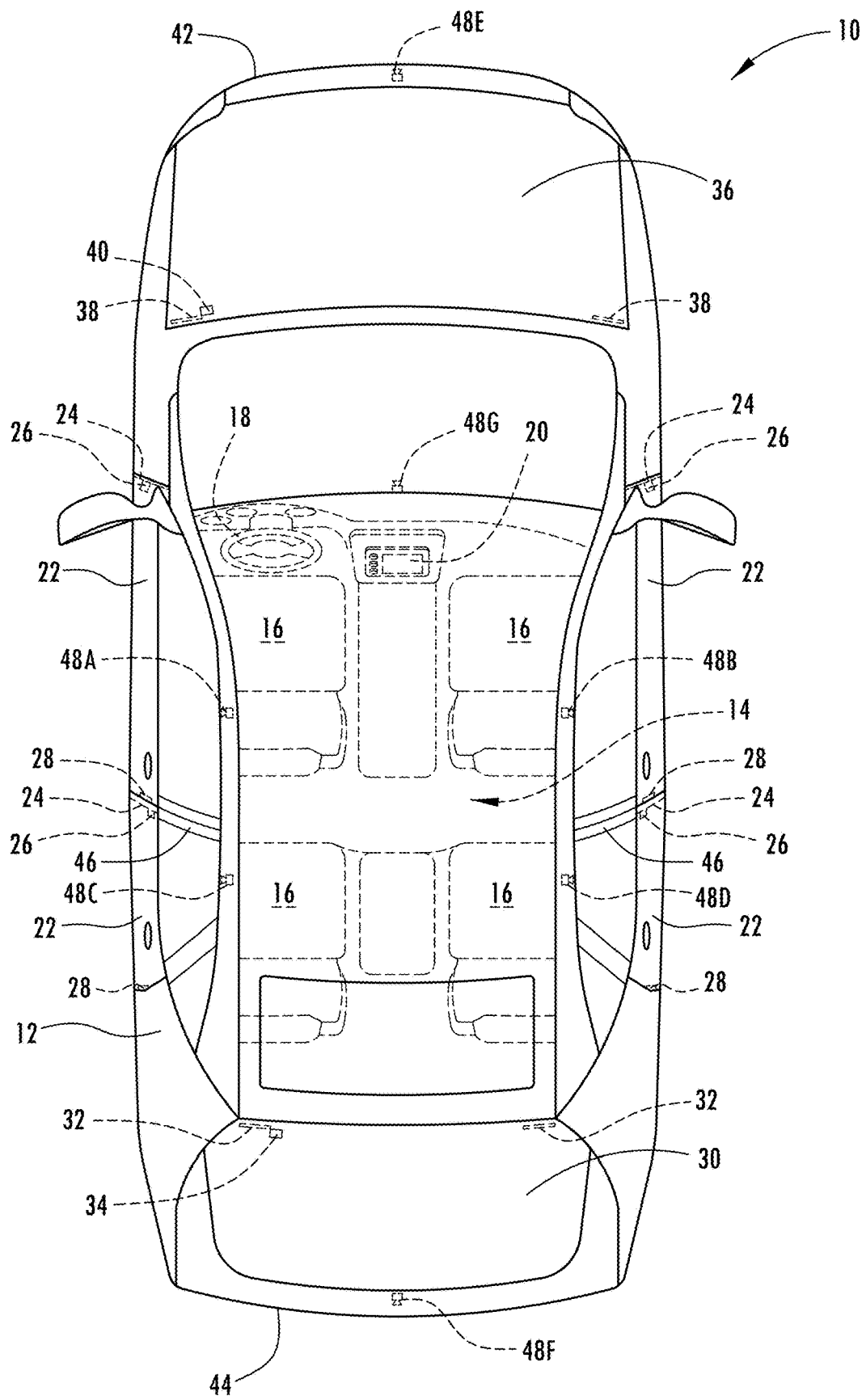
FIG. 1 is a top schematic view of a motor vehicle equipped with powered doors and imaging devices and controls for identifying a user and controlling one or more doors, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having powered doors with user identification and door control. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated having a cabin interior 14 defined by a vehicle body 12 and configured with passenger seating for transporting passengers in the vehicle 10. The cabin interior 14 is generally defined by the vehicle body 12 and may include various features and trim components within the cabin interior 14. The cabin interior 14 may include an arrangement of passenger seats 16 including a first or front row of driver and passenger seats generally located towards the front of the cabin interior 14 and one or more rows of passenger seats located rearward of the front row of passenger seats. The vehicle 10 may be equipped with a steering wheel 18 located in front of the driver seat to enable the driver to steer the vehicle road wheels. Additionally, one or more human-machine interfaces (HMI), such as a touchscreen display 20, audio speakers, microphone, etc., may be provided on the vehicle 10 to communicate with the driver and one or more passengers in the vehicle 10.

The vehicle 10 is equipped with powered doors and user detection and controls to assist with operation of the doors of the vehicle 10 to allow authorized users such as the driver and passengers to enter the vehicle 10. The vehicle 10 has a plurality of powered closure doors that include four side passenger doors 22, with two doors on each opposite lateral side of the vehicle 10. In addition, the vehicle 10 has a powered rear trunk door 30 such as a powered liftgate or tailgate at the rear of the vehicle 10 and a powered front trunk door 36 at the front of the vehicle 10. Each of the powered doors 22, 30 and 36 may close a space such as a space of the cabin interior 14 in the closed position and allow access to the cabin interior 14 in an open position. The powered doors 22, 30 and 36 are power-operated doors, each having an actuator, such as an electric motor, for moving the corresponding door between the closed and open door positions. The actuators may move the powered doors between the open and closed door positions in response to detecting an authorized user approaching the vehicle 10 to enter the vehicle 10 or a user input, such as an input entered on a vehicle mounted switch panel, a key fob, a smartphone or other electronic device. The powered doors may be opened by the actuators in response to detecting movement or position of an authorized user approaching the vehicle 10. Additionally, the powered doors may be controlled to open partway or at different speeds.

It should be appreciated that the vehicle 10 may include additional rows of seating and powered doors, such as may be found on large SUVs, vans and buses. For example, the vehicle 10 may include two side doors or more than four side doors. The vehicle 10 may be a motor vehicle, such as a wheeled car, truck, SUV, van or bus, for example, having one or more powered doors. Each of the powered doors moves relative to the body 12 of the vehicle 10 between a closed door position and an extended open door position and therefore may require space to move between the closed and open door positions. The vehicle controls advantageously assist with identification of an authorized user and operation of the powered doors.

The vehicle 10 is shown in FIG. 1 having four side powered doors 22, with two of the side doors 22 located forward and adjacent to the front row of seats 16 and the other two of the side doors 22 located rearward thereof and adjacent to the second or rear row of seats 16. Each of the side doors 22 may include a door panel and window that pivots about hinges 24 generally along a vertical axis to allow the door 22 to swing outward through a swing path to an open door position or inward to a flush position with the body 12 of the vehicle 10 where it may be latched via latch 28 in the closed door position. The side doors 22 are powered and each includes an actuator such as an electric motor 26 which may be located at or near one of the hinges 24 to power actuate the powered door 22 between the closed and open door positions. The side doors may also include a switch to receive a door open or door closed input from a user.

The vehicle 10 has a rear trunk 30 and a front trunk 36, each of which pivots between a closed position and an open position. The rear trunk 30 pivots about a pair of horizontal hinges 32 and is actuated by an actuator, such as an electric motor 34. The front trunk 36 likewise has a pair of horizontal hinges 38 and is actuated by an actuator, such as an electric motor 40. The rear trunk 30 and front trunk 36 may each also include a user input switch.

The vehicle 10 is equipped with a plurality of imaging sensors that are located and oriented on the vehicle 10 for sensing objects such as potential users, e.g., driver and passengers expected to enter the vehicle 10 or passing by the vehicle 10 and obstacles outside of the vehicle 10 and within a space surrounding the vehicle 10. The plurality of imaging sensors generate signals indicative of the sensed objects. The plurality of imaging sensors may include a plurality of imaging devices, such as two side view cameras 48A and 48B, which are shown located on opposite lateral sides of the vehicle 10 shown near the roof and forward of the B-pillars 46, two side view cameras 48C and 48D shown near the roof and rearward of the B-pillars, a lower front view camera 48E shown in a front fascia 42 of the vehicle 10, a rear view camera 48F shown in a rear fascia 44 of the vehicle 10, and an upper front view camera 48G shown mounted near the upper edge of the windshield. Each of the cameras 48A-48G may acquire images of zones in the space around the perimeter of the vehicle 10, particularly covering the door detection regions for the powered doors. The acquired images may be processed by a controller using video processing to identify objects such as one or more people as potential users and the position of the people relative to the vehicle 10 and the powered doors 22.

The vehicle 10 may also be equipped with a plurality of sensors that may include radar sensors located, for example, at each of the four corners of the vehicle 10 for sensing objects located outside of the vehicle and within the space surrounding the vehicle 10. The radar sensors transmit radio waves and process their reflections from objects to determine distance to the object and location of the object. Further, the plurality of sensors may include a plurality of ultrasonic sensors located, for example, at various locations along the front portion and rear portions of the vehicle 10. As such, the radar and ultrasonic sensors may be used to detect the location, size and relative distance from the vehicle 10 to the detected objects. It should be appreciated that other sensors may be employed by the vehicle 10 to sense objects, such as potential users, relative to the vehicle 10, including objects proximate the powered doors, and generate sensed signals that may be used to identify each object and the distance and location of the sensed object relative to the vehicle 10 for use in assisting with the operation of the vehicle 10 and the powered doors of the vehicle 10.

Figure 2A:
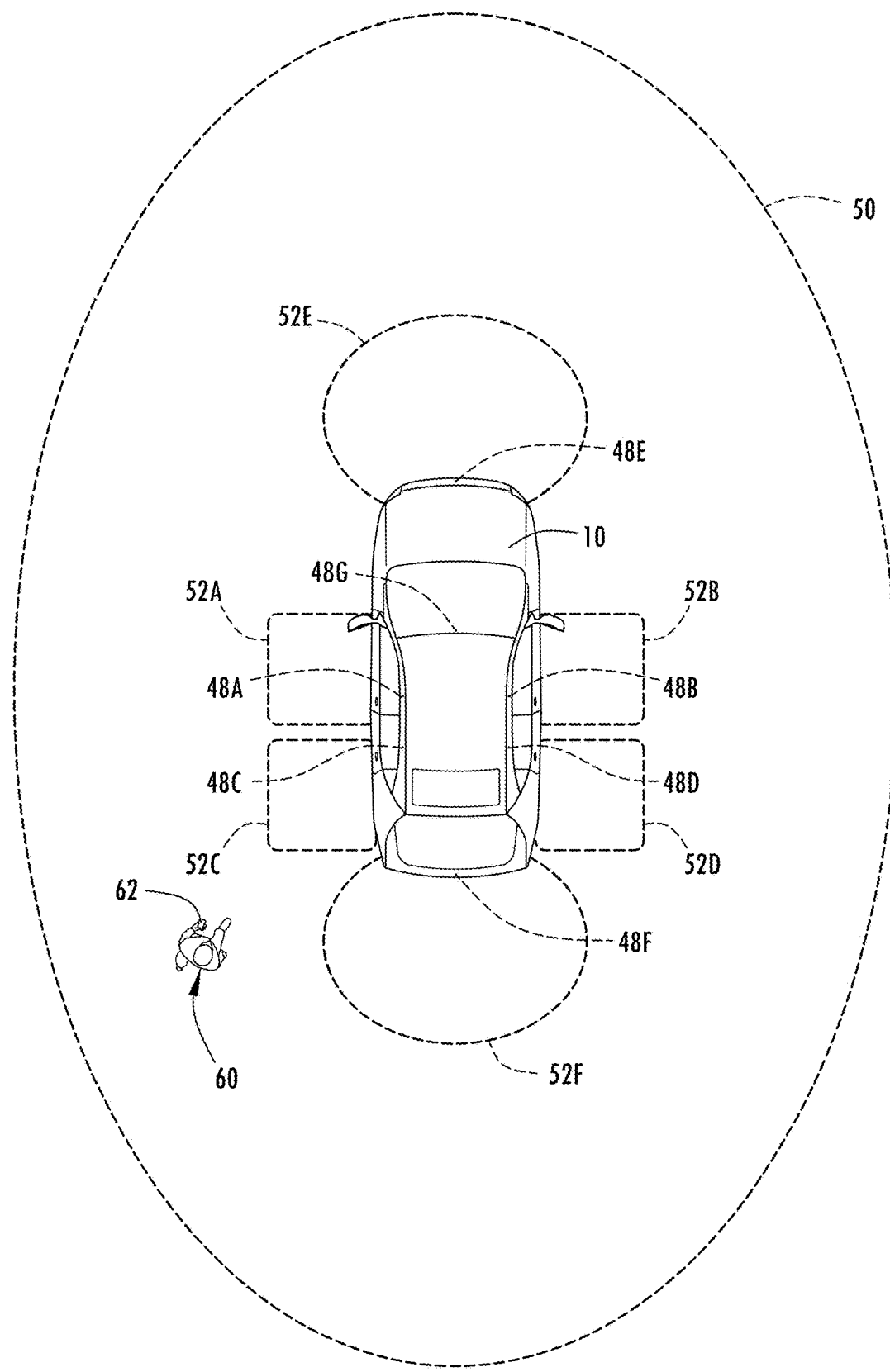
FIG. 2A is a top view of a user proximate to and approaching the vehicle, according to one example.

The vehicle 10 is illustrated in FIG. 2A in a first case scenario, also referred to as use case A scenario, in which a single authorized user 60, shown as a person (human being) in possession of a mobile device 62 approaching the vehicle 10, according to one example. The vehicle 10 defines an approach detection (AD) zone 50 that encompasses an area around the vehicle 10. The approach detection zone 50 may be a semi-circular or oblong zone, as shown, that extends about 3-5 meters, for example, from the vehicle and defines a region in which the vehicle detects the presence of an authorized mobile device. It should be appreciated that the approach detection zone 50 may have other shapes and sizes, such as a circular shape, a square shape, etc. When an authorized mobile device 62 is present within the approach detection zone 50, the vehicle 10 detects the mobile device 62 and wakes up sensing and control circuitry and may activate perimeter lighting. Once the vehicle circuitry wakes up, the imaging cameras 48A-48G are activated to capture images within the approach detection zone 50. It should be appreciated that the location of a mobile device may be detected based on signal communication with one or more transceivers on the vehicle 10 or by using positioning data, such as global position system (GPS) data from the mobile device, or by dead reckoning software running on the mobile device. It should be appreciated that the distance between a user and a vehicle may otherwise be determined, such as via global position system (GPS) provided on the user's phone, dead reckoning of the phone, or by determining time-of-flight RF signal communication between an electronic device associated with the user and the vehicle or using triangulation between an electronic device associated with the user and a plurality of transceivers located on the corresponding vehicle or using RSSI, AoA or RF signal phase detection, for example.

The imaging devices 48A-48G capture images within the approach detection zone 50 and may detect one or more potential users that approach or walk in close proximity to the vehicle 10. The vehicle 10 also has a plurality of door detection (DD) zones 52A-52F. Each door detection zone 52A-52F defines a region proximate to a powered door on the exterior side of the vehicle 10. The door detection zones 52A-52F may each extend 1-2 meters outward, for example, in a defined shape such as a rectangular or circular area from the corresponding doors. When a person detected in the captured images enters one of the door detection zones 52A-52F, the vehicle 10 may initiate the process of granting access and activate the corresponding door motor to power actuate the door to the open position. In FIG. 2A, a single authorized user 60 is illustrated approaching vehicle 10 with a mobile device 62, such as a smartphone or key fob, in possession. When the authorized user 60 enters a door detection zone such as zone 52A with an authorized mobile device 62, the mobile device 62 is recognized and the user is determined to be within a certain door detection zone and the powered door 22 proximate to the corresponding door detection zone is activated to the open position to allow the authorized user 60 to enter the vehicle 10. If the user 60 approaches a different door detection zone, the powered door associated with the different door detection boundary zone is actuated to the open position. As such, the authorized user may be a driver of the vehicle 10 entering a driver door or may be a passenger of the vehicle 10 entering a passenger door or the authorized user may be accessing the rear trunk 30 or front trunk 36, in which case, the corresponding powered door may be actuated to the open position.

Figure 2B:
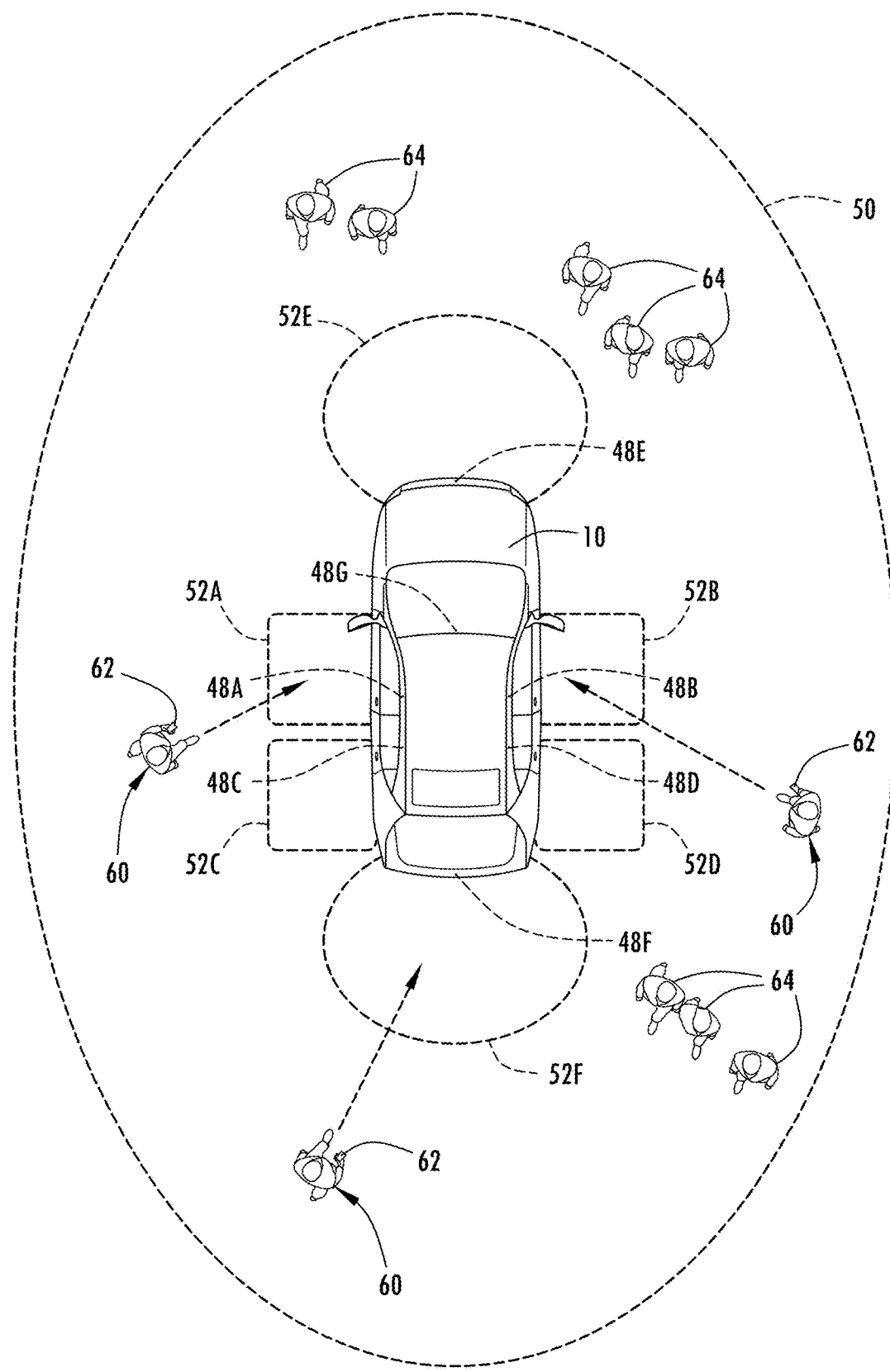
FIG. 2B is a top view of users and other people proximate to the vehicle, according to another example.

Referring to FIG. 2B, the vehicle 10 is illustrated according to a second case scenario, also referred to as use case B scenario in which a plurality of authorized users 60 and other persons 64 are present within the approach detection zone 50. In this scenario, multiple authorized users are detected within the approach detection zone 50 using mobile devices 62 on which vehicle 10 may perform mobile device detection or vehicle 10 may track the face or gait features associated with the multiple users. When this occurs, the mobile devices carrier with the users are detected and the imaging cameras capture images of the potential authorized users and process the captured images to detect characteristics of the potential authorized users. This may include using facial recognition to track and recognize the face characteristics of a user to identify an authorized user. When an authorized user is identified and recognized using facial recognition and is detected located within a door detection zone, the corresponding door is actuated to the open position to allow the authorized user to enter the vehicle via that powered door. As such, facial recognition may be used to identify which drivers and passengers are authorized to enter which door on the vehicle 10. It should be appreciated that a mobile device accompanying an authorized user may recognize whether the user is a driver or a passenger of the vehicle 10 which may be used to determine which door to open.

Figure 2C:
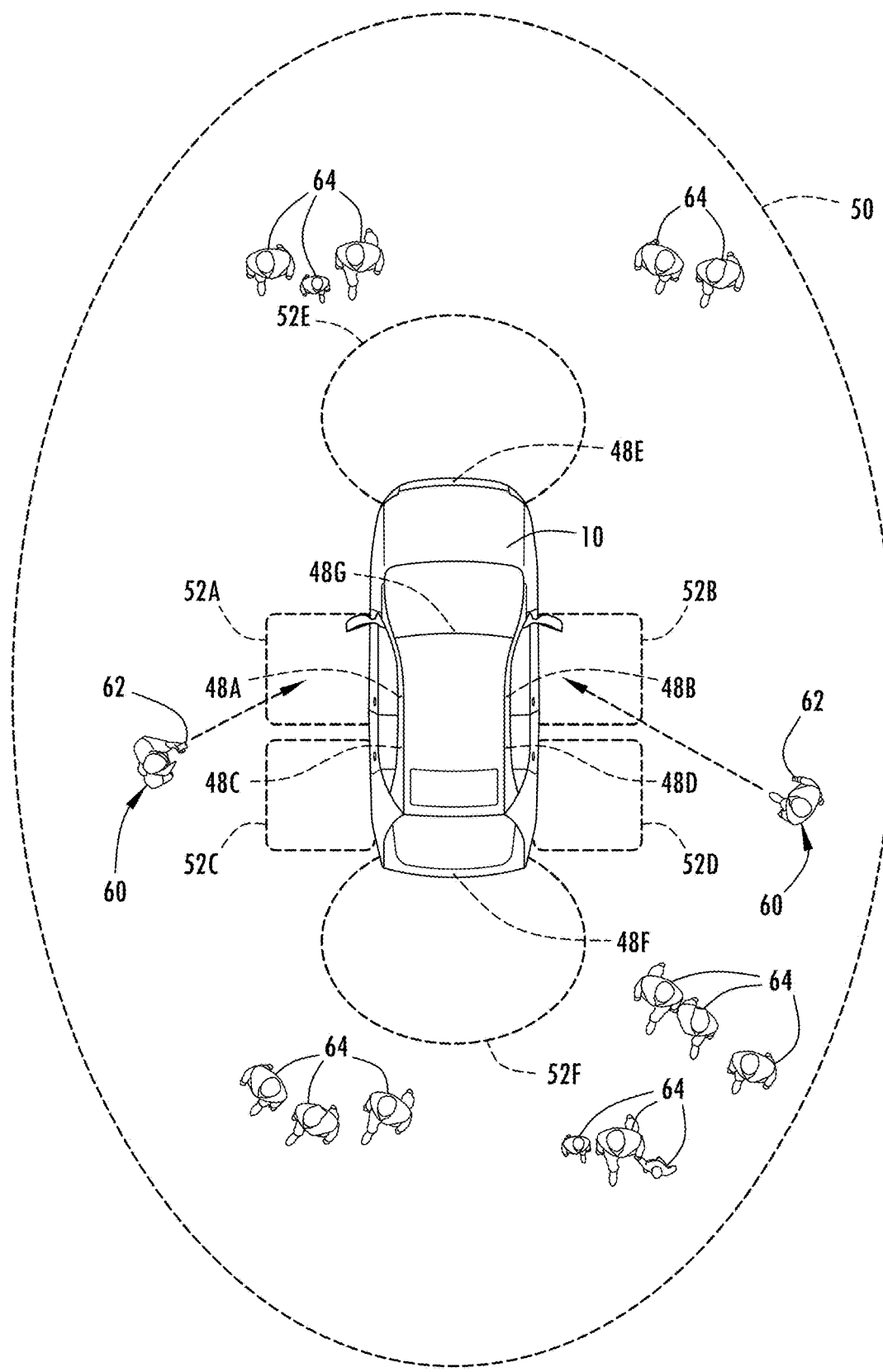
FIG. 2C is a top view of users and other people proximate to the vehicle, according to a further example.

Referring to FIG. 2C, the vehicle 10 is shown according to a third scenario, also referred to as the use case C scenario. In this scenario, a plurality of persons, including authorized users 60 and other persons 64 are located within the approach detection zone 50. However, the face of all potential users may not be captured by the imaging devices and therefore may not be identified. When this occurs, the imaging cameras may detect other characteristics of each person which may be processed to determine biometric authentication. The other identified characteristics may include identifying an upper body portion such as the torso including shoulders and arms of a person and the lower body portion including the legs of a person. The controller may process the captured images and determine the gait of each person. The gait may include the body movement of the person such as identifying how the person walks with the upper body and/or lower body to identify the person from the gait of their legs, for example. In addition, the mobile device may include an acceleration sensor that may be used to identify a gait pattern from the sensed acceleration signal as the user walks, runs or otherwise moves. The acceleration based gait pattern may be compared to a camera gait observed from the captured images to determine if a match occurs and, if so, may be used to identify the user as an authorized user and to actuate and open a powered door when the authorized user enters one of the door detection zones 52A-52F.

Figure 3A:
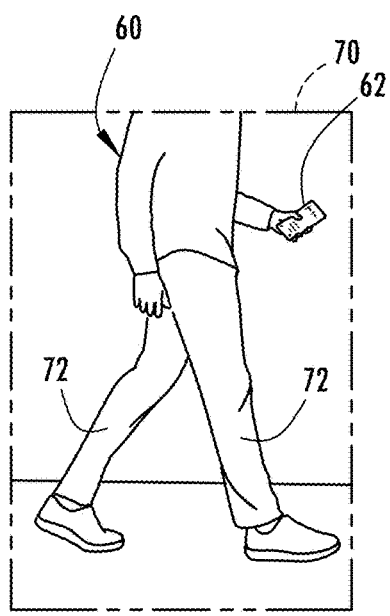
FIG. 3A is a captured image of a person showing a lower body gait including the legs, according to one example.
Figure 3B:
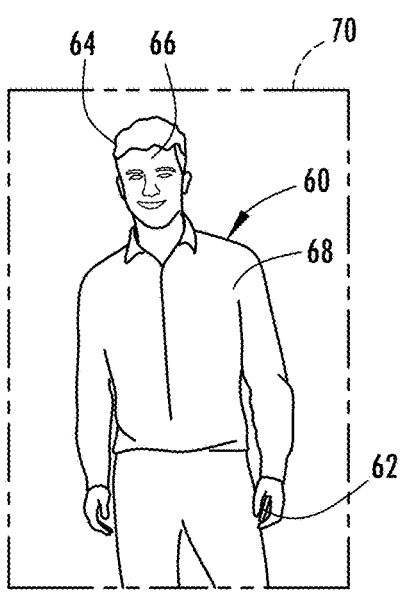
FIG. 3B is a captured image showing a person and their upper body gait including the head with face and torso.
Figure 3C:
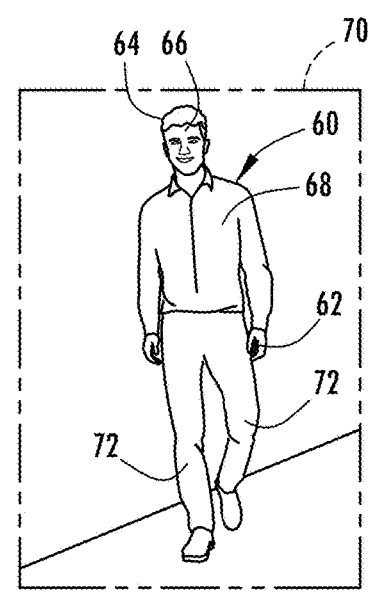
FIG. 3C is a captured image showing the entire body of a person approaching the vehicle.

Referring to FIGS. 3A-3C, captured images 70 of a potential authorized user are illustrated, according to three examples. In FIG. 3A, the lower body portion below the head of a user is captured on one side and is processed to determine a gait of the user as the user walks with the legs 72. In FIG. 3B, an upper body portion of a potential user on the front side is captured in image 70 and is processed to determine characteristics of the face 66 using facial recognition and/or upper body gait movement including movement of the shoulders and upper torso 68. In the example shown in FIG. 3C, a potential user is captured in an image 70 which includes the entire body parts on a front side, such that the facial recognition may be employed and the gait recognition while using the upper and/or lower body may be used.

Figure 4:
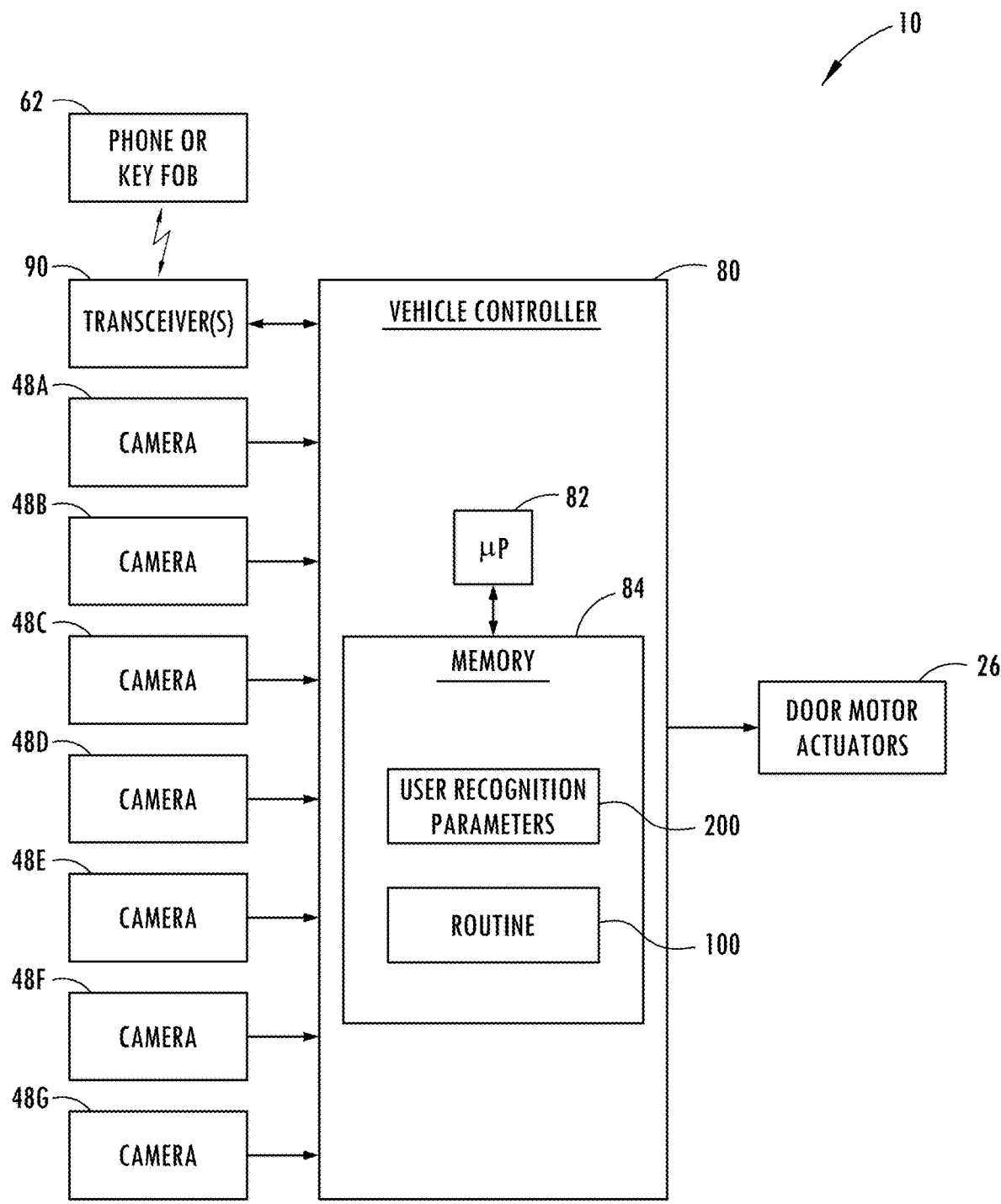
FIG. 4 is a block diagram of the vehicle illustrating a controller configured to detect and identify a user and control one or more powered doors on the vehicle.

Referring to FIG. 4, the vehicle 10 is shown having a vehicle controller 80 that detects an authorized user, such as a driver, attempting to enter the vehicle 10 and controls one or more powered doors. The vehicle controller 80 may include control circuitry, such as a microprocessor 82 and memory 84. It should be appreciated that the vehicle controller 80 may be comprised of analog and/or digital control circuitry. Stored in memory 84 are one or more routines including routines 100 which may be executed by the microprocessor 82. In addition, various stored user recognition parameters may be stored in memory 84 and processed by the microprocessor 82. The stored user recognition parameters 200 may include stored facial characteristics, body characteristics and gait characteristics of known authorized users who provided these biometric characteristics during enrollment as an authorized user of the vehicle 10, for example. Additionally, memory 84 may be used for short-term temporary storage of the real-time collection of acceleration gate from the mobile device and real-time acquired gait obtained from one or more cameras 48A-48G in order to support scenarios where gait of observed users did not produce a match with the biometric characteristics stored on the vehicle. In this situation, the vehicle 10 will accept a match to what is seen in real-time from the gait measured by the device 62 as compared to one or more of the unknown gaits observed by the cameras 48A-48G. The vehicle controller 80 receives inputs from the plurality of sensors located on the vehicle 10 including the imaging cameras 48A-48G. In addition, the vehicle controller 80 generates one or more outputs. The one or more outputs may serve to activate one or more door motor actuators to open or close the powered doors.

The controller 80 also communicates with one or more mobile devices 62, such as smartphones, key fobs, etc. via one or more transceivers 90. The controller 80 may determine a location of each mobile device by processing signals received from the mobile device such as GPS signals, directional signals, signal amplitudes, angle of approach that are processed via trilateration, triangulation, etc.

Figure 5A:
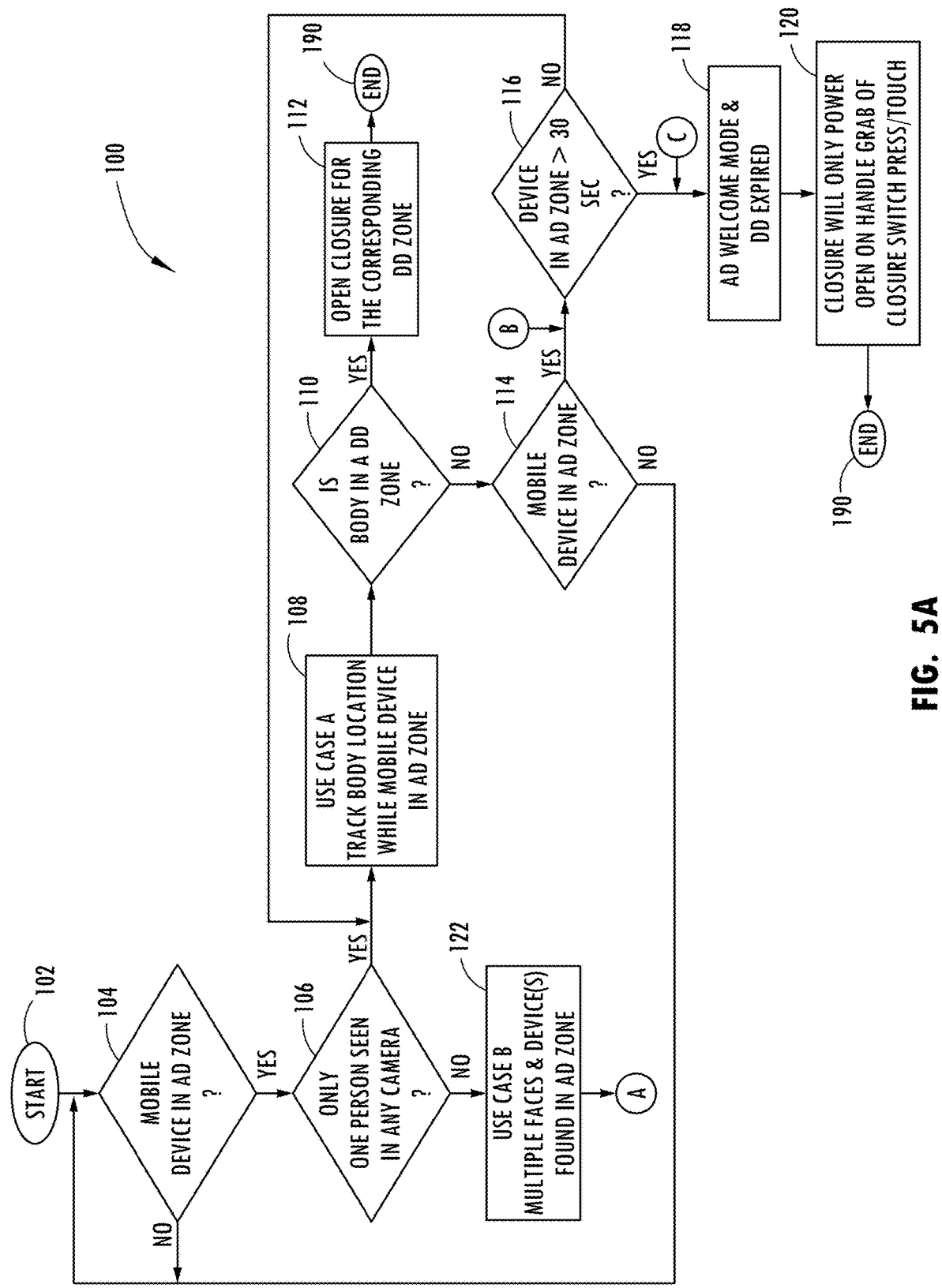
FIGS. 5A-5B is a flow diagram illustrating a routine for identifying a user and actuating a powered door on the vehicle, according to one example.
Figure 5B:
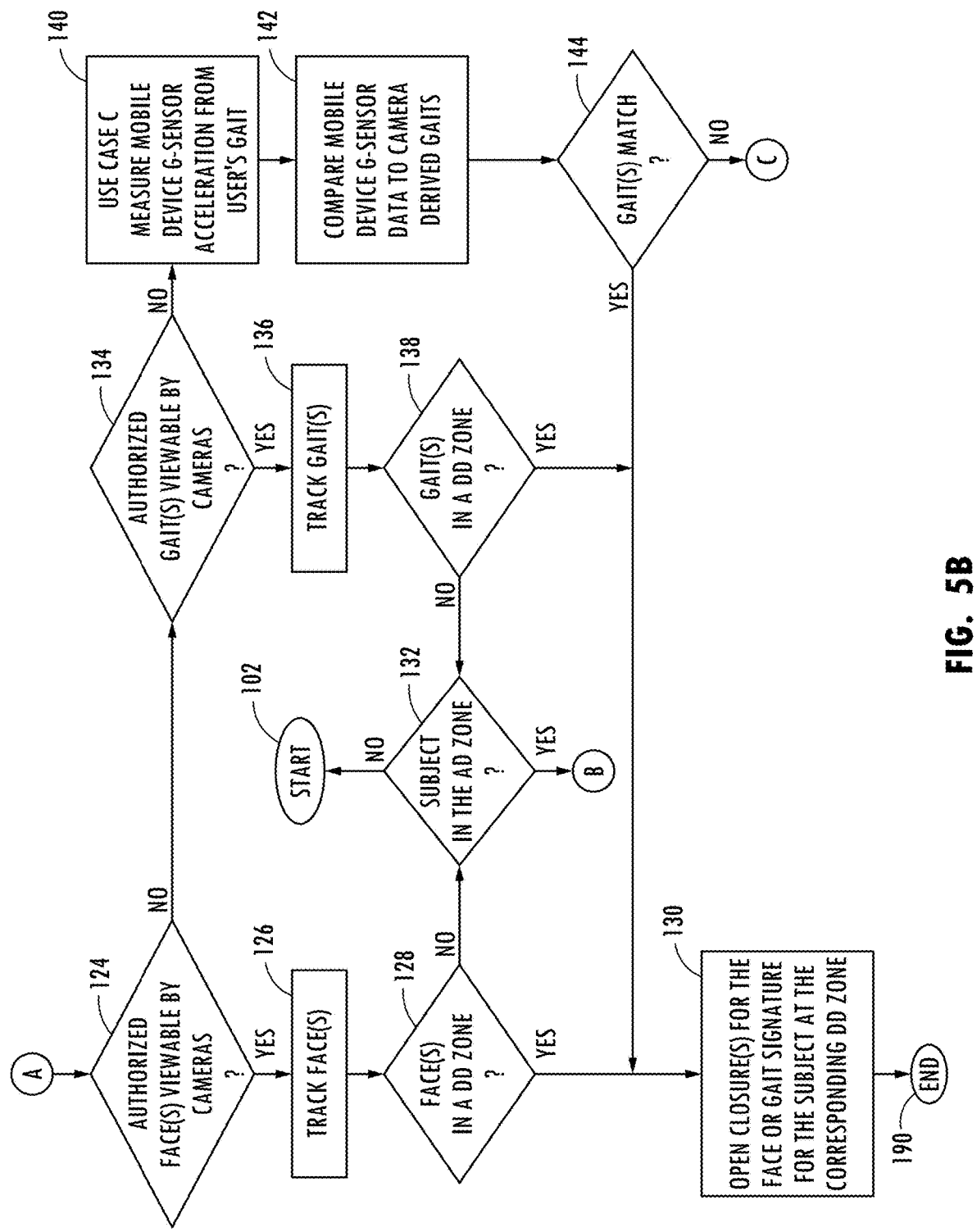

Referring to FIGS. 5A and 5B, a routine 100 is illustrated for identifying potential authorized users approaching a vehicle and controlling one or more powered doors to provide open door access to the vehicle, according to one example. Routine 100 starts at step 102 and proceeds to decision step 104 to determine if a mobile device is detected in the approached detection zone. If no mobile device is detected in the approached detection zone, routine 100 waits for an authorized mobile device to enter the zone. Once an authorized mobile device enters the approach detection zone, routine 100 proceeds to decision step 106 to determine if only one person is captured in the approach detection zone with any of the imaging cameras. If only a single person is captured within the approach detection zone, routine 100 proceeds to step 108 for use case A scenario in which the body location of the person is tracked while the mobile device is detected in the approach detection zone. Next, at decision step 110, routine 100 determines if the body of the person is within a door detection zone and, if so, opens the door closure for the corresponding door detection zone at step 112, before ending at step 190. If the body of the person is not determined to be located within a door detection zone, routine 100 proceeds to decision step 114 to determine if the authorized mobile device is still within the approach detection zone and, if not, returns to start at step 102. If an authorized mobile device is still located within the approach detection zone, routine 100 proceeds to decision step 116 to determine if the mobile device is in the approach detection zone for greater than a time period, such as 30 seconds and, if so, proceeds to step 118 to enter the approach detection welcome mode, and door detection boundary zone expires before proceeding to step 120 where the closure will only power open on a manual handle grab or the closure panel switch press touch, or other activations such as a touch button on a phone, a smart device, a gesture in front of the door, etc. before ending at step 190. Otherwise, if the 30 second time period has not lapsed, routine 100 returns to step 108.

Returning to decision step 106, if more than one person is captured in the images within the approach detection zone, routine 100 proceeds to decision step 122 for use case B scenario to process multiple faces and mobile devices via the approach detection zone. At decision step 124, routine 100 determines if the face or faces of one or more authorized users is viewable by the imaging cameras. If the face or faces are viewable, routine 100 proceeds to step 126 to track the facial characteristics of the potential authorized users, and then to decision step 128 to determine if the detected faces of the potential authorized users are located within a door detection zone. If authorized faces are detected within a door detection zone, routine 100 proceeds to step 130 to open the door closure for the authorized user using a face recognition or recognition gait signature for the user at the corresponding door detection boundary zone before ending at step 190. If the user's face is not detected within a door detection zone, routine 100 proceeds to step 132 to determine if the user is still in the approach detection zone and, if not, returns to start. If the user is still within the approach detection zone, routine 100 proceeds to step 116 to determine if the authorized mobile device has been within the approach detection zone for the time period of greater than 30 seconds and, if so, proceeds to step 118 to enter the approach detection zone welcome mode and the door detection zone expires and at step 120 where the closure only occurs with a manual actuation, before ending at step 190.

Returning to decision step 124, if the authorized face or faces are not viewable by a camera, routine 100 proceeds to decision step 134 to determine if one or more authorized gaits are viewable by the cameras in the approach detection zone. If so, authorized gaits are tracked at step 136, then routine 100 proceeds to decision step 138 to determine if the detected gaits are located within a door detection zone. If the gaits are identified within a door detection zone, routine 100 proceeds to step 130 to open the door closure using the gait signature for the user at the corresponding door detection zone, before ending at step 190. Otherwise, routine 100 proceeds to step 132 to determine if the user is still located within the approach detection zone. If the authorized gaits are not viewable by the camera in decision step 134, routine 100 proceeds to step 140 for use case C scenario in which a mobile device having a G-sensor is used to measure the acceleration from the user's gait as the user moves, e.g., walks. Next, the mobile device G-sensor data is compared to the camera detected gaits at step 142 and a match is determined at decision step 144. If the mobile device gait matches the camera detected gait, routine 100 proceeds to step 130 to open the door closure for the gait signature for the corresponding user at the corresponding door detection zone. Otherwise, if the gaits do not match, routine 100 proceeds to step 118.

Accordingly, the vehicle 10 advantageously monitors a zone proximate to the vehicle and identifies one or more authorized users approaching and entering one or more door detection zones and automatically opens the corresponding door closure to allow access to the vehicle 10. The vehicle 10 may employ facial recognition and may monitor the gait of the user to identify which users are authorized and may open the powered doors to accommodate the authorized users.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a powered door having an actuator, wherein the powered door is movable between open and closed positions;
a transceiver configured to communicate with one or more mobile devices;
an imaging device oriented to capture images in a region proximate to the powered door; and
a controller processing the captured images and controlling the actuator, wherein the controller is configured to activate the actuator to move the powered door to the open position when a mobile device is detected proximate the vehicle and a user is detected in the captured images located in a door detection zone, the controller is configured to activate the actuator to move the powered door to the open position when the controller detects a face of the user in the captured images using facial recognition and recognizes the user as an authorized user located in the door detection zone, and the controller is configured to activate the actuator to move the door to the open position when the controller detects a gait of the user and identifies the gait is indicative of the authorized user located in the door detection zone, wherein the controller determines an acceleration based gait of the user by processing an acceleration signal generated by an acceleration signal in the mobile device, wherein the controller compares the acceleration based gait determined with the mobile device with an image based gait determined from the captured images to determine if the user is the authorized user.

2. The vehicle of claim 1, wherein the actuator actuates the door to move the door to the open position when the authorized user with a mobile device is detected in the door detection zone.

3. The vehicle of claim 1, wherein the actuator comprises a motor.

4. The vehicle of claim 1, wherein the door comprises a driver's door of the vehicle.

5. The vehicle of claim 1, wherein the imaging device comprises a camera.

6. The vehicle of claim 1, wherein the mobile device comprises one of a phone and key fob.

7. The vehicle of claim 1, wherein the image based gait is detected by monitoring a body of the user.

8. The vehicle of claim 1, wherein the controller detects for the gait of the user when two or more persons are detected in the captured images in the region.

9. The vehicle of claim 1, wherein the vehicle has a plurality of powered doors each having an actuator, wherein the controller detects the user within a door detection zone proximate one powered door and opens the one powered door.

10. The vehicle of claim 1, wherein the controller detects a plurality of users and activates a plurality of actuators to open a plurality of doors.

11. A vehicle comprising:
a plurality of powered doors;
a plurality of actuators for moving the plurality of powered doors between open and closed positions;
a transceiver configured to communicate with one or more mobile devices;
a plurality of imaging devices oriented to capture images in a region proximate to the plurality of powered doors; and
a controller processing the captured images and controlling the plurality of actuators, wherein the controller is configured to activate a first actuator to move a first powered door to the open position when a mobile device is detected proximate the vehicle and a user is detected in the captured images located in a first door detection zone, the controller is configured to activate the first actuator to move the first powered door to the open position when the controller detects a face of a first user in the captured images using facial recognition and recognizes the first user as an authorized first user located in the first door detection zone, and the controller is configured to activate the first actuator to move the first door to the open position when the controller detects a gait of the user and identifies the gait is indicative of an authorized user located in the first door detection zone, wherein the controller activates a second powered door to move the second powered door to the open position when the controller detects a face of a second user in the captured images using facial recognition and recognizes the second user as an authorized second user located in a second door detection zone.

12. The vehicle of claim 11, wherein the controller determines an acceleration based gait of the first user with an acceleration signal generated by an acceleration signal in the mobile device, and wherein the controller compares the acceleration based gait determined with the mobile device with an image based gait acquired by the plurality of imaging devices to determine if the first user is the authorized first user.

13. A method of controlling a powered door on a vehicle, the method comprising:
detecting a mobile device associated with an authorized user in a region proximate the vehicle;
capturing images in the region proximate to the powered door of the vehicle with an imaging device;
processing the captured images to detect one or more users;
searching for a face of the authorized user in the captured images;
activating an actuator to move the powered door to the open position when the face of the authorized user is detected using image recognition;
detecting a gait of the authorized user in the captured images;
determining a presence of the authorized user based on the detected gait; and
activating the actuator to move the powered door to the open position when the gait is indicative of the authorized user, wherein the vehicle has a plurality of powered doors each having an actuator, wherein the method detects a user within a door detection zone proximate one powered door and opens the one powered door.

14. The method of claim 13, wherein the mobile device comprises one of a phone and key fob.

15. The method of claim 13, further comprises determining an acceleration based gait of the user with an acceleration signal generated in the mobile device, and comprising the acceleration based gait determined with the mobile device with an image based gait acquired by the plurality of imaging devices to determine if the user is an authorized user.

16. The method of claim 15, wherein the image based gait is detected by monitoring a body of the user.

17. The method of claim 13, wherein the gait of the authorized user is processed when two or more users are detected in the captured images in the region.

* * * * *